Sept. 30, 1958  A. H. REDDING  2,853,880
ABSOLUTE PRESSURE SENSING DEVICE
Filed March 10, 1954

INVENTOR
ARNOLD H. REDDING
BY
Ralph T. French
ATTORNEY

United States Patent Office 2,853,880
Patented Sept. 30, 1958

2,853,880

ABSOLUTE PRESSURE SENSING DEVICE

Arnold H. Redding, Wallingford, Pa., assignor to Westinghouse Electric Corporation, East Pittsburgh, Pa., a corporation of Pennsylvania Application March 10, 1954, Serial No. 415,340

1 Claim. (Cl. 73—419)

This invention relates to a pressure sensing device, more particularly to a device for sensing absolute pressure, and has for an object to provide an improved device of this character.

In present practice, a spring-loaded, evacuated bellows or similar device is required to attain a response proportional to absolute pressure. Such devices have two serious limitations: (a) the ever-present possibility of leakage of the bellows, and (b) the low power output when accurate response is required. With regard to the above limitations, (a) is self-explanatory and (b), as generally understood in the art, is due to the high hysteresis and non-linear spring constant of the bellows. To minimize the inaccuracy resulting from the hysteresis and non-linear spring constant, means must be provided for returning the bellows to its null position, hence the power available is insufficient to operate control valves or the like.

In view of the above, it is a further object to provide a device responsive to absolute pressure and capable of providing an accurate response with sufficient power to position a control valve, a relay or the like.

These and other objects are effected by the invention as will be apparent from the following description taken in connection with the accompanying drawings, forming a part of this application, in which.

Figure 2:
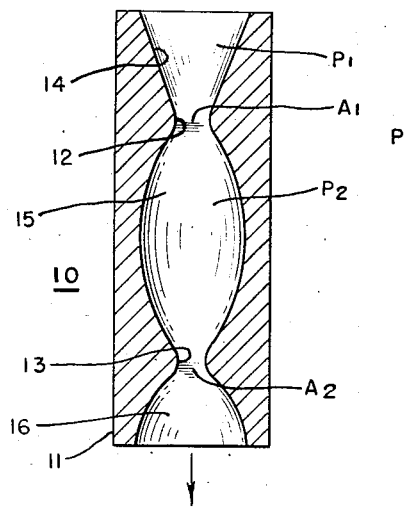
Fig. 2 is an axial diagrammatic view of a member illustrating the theory of operation of the device shown in Fig. 1.

Referring to the drawings in detail, especially Fig. 2, there is shown a member 10 having a tubular wall 11 provided with inner restricted portions 12 and 13 and forming a central passage having enlarged chambers 14, 15 and 16. The restricted portion 12 forms an orifice $A_1$ connecting chambers 14 and 15, while the restricted portion 13 forms an orifice $A_2$ connecting chambers 15 and 16.

When the member 10 is connected to a source of fluid $P_1$ flowing under pressure in the direction of the arrows, the pressure in chamber 14 is equal to $P_1$ while the pressure in chamber 15 is equal to a lower pressure $P_2$. By properly selecting the cross-sectional areas of the orifices $A_1$ and $A_2$, critical flow will occur through the orifice $A_2$ when the pressure of $P_1$ is above a predetermined value.

Figure 3:
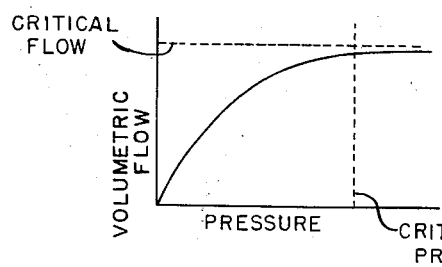

Although critical flow phenomena through an orifice is well known in the art, the chart shown in Fig. 3 serves to graphically point out that when fluid under pressure flows through an orifice, the volumetric flow increases with pressure until the pressure attains a certain value (indicated on the chart as the critical pressure). Beyond the critical pressure point, volumetric flow through the orifice is constant regardless of the increase in pressure of the fluid. This flow has been indicated on the chart as critical flow.

Figure 4:
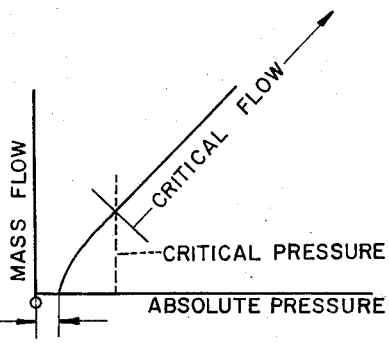
Figs. 3 and 4 are charts illustrating fluid conditions required in the devices shown in Figs. 1 and 2.

The chart in Fig. 4 is similar to that in Fig. 3 except that mass flow is plotted against absolute pressure. Hence, the amount of back pressure on the orifice that must be overcome before gas flow through the orifice is attained has been so indicated. The curve thus attained graphically points out that when a gas under pressure flows through an orifice, the mass flow increases with inlet pressure in a curvi-linear manner until the pressure attains the critical pressure for the orifice. Beyond the critical pressure point, mass flow through the orifice increases in a straight line with increasing inlet pressure, thus graphically showing that at pressures above the critical pressure the mass flow through the orifice is proportionate to the pressure at the inlet of the orifice. This portion of the curve has been labeled "critical flow."

The laws governing this type of flow are such that if sufficient pressure is available, so that critical flow conditions exist in the orifice $A_2$, the pressure ratio of $P_1$ in chamber 14 to $P_2$ in chamber 15 will be constant, and the absolute pressure $P_1$ will be directly proportional to the difference between $P_1$ and $P_2$.

Figure 1:
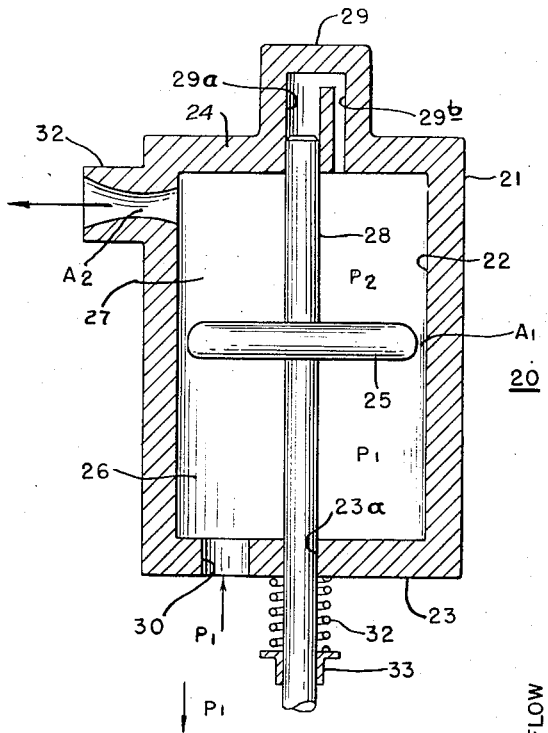
Fig. 1 is an axial sectional view showing, diagrammatically, a device incorporating the invention.

Using the above principle, a sensing device responsive to absolute pressure may be made, in accordance with the invention. Referring to Fig. 1 in detail, there is shown an absolute pressure sensing device generally indicated 20 having a housing 21 provided with an inner bore 22 which may be of any cross-sectional shape, for example, cylindrical, and having end walls 23 and 24 closing the ends of the bore 22. A piston 25 is disposed within the bore 22 and serves to divide the bore into a first chamber 26 and a second chamber 27. The piston 25 is carried by a rod or shaft 28, the lower end of which extends through an opening 23a in the end wall 23 and is mounted in slidable relation therewith. The housing 21 is further provided with a raised boss portion 29 having a bore 29a in which the upper end of the shaft 28 is slidably received. Thus the piston 25 together with its shaft 28 are freely movable in axial direction as a unit. The boss 29 is further provided with a passage 29b connecting the upper end of the bore 29a with the chamber 27, thereby permitting equalization of the fluid pressure in the bore 29a with that existing in the chamber 27.

The piston 25 preferably has the same cross-sectional shape as the bore 22. However, the cross-sectional area of the piston is slightly smaller than the cross-sectional area of the bore, so that the peripheral edge of the piston together with the wall of the bore 22 cooperate to form a restricted annular orifice $A_1$. A relatively large unimpeding opening 30 is provided in the housing 21 for connection to a source of gaseous fluid under pressure (not shown but indicated by the arrow as having a pressure of $P_1$ value) to the chamber 26. At the opposite end of the housing 21, a restricted orifice $A_2$ is provided by an extended tubular member 32, which orifice $A_2$ serves to connect chamber 27 to the ambient. The orifice $A_2$ is of such cross-sectional area that critical flow of fluid therethrough is maintained within the normal range of operation of the device. Stated another way, the orifice $A_2$ is of such size and shape that critical flow therethrough is attained for all values of $P_1$ attained in normal operation.

It will now be seen that the pressure sensing device 20 is similar to the tubular member 10, previously described and that the chambers 26 and 27 and the orifices $A_1$ and $A_2$ of the sensing device 20 correspond to the chambers 14 and 15 and orifices $A_1$ and $A_2$, respectively, of the tubular member. The main and important distinction lies in the movable piston 25 which yields in response to the fluid pressure imposed thereon to provide a useful movement. It will also be noted that as the piston is displaced its adjacent orifice $A_1$ is also displaced, thereby maintaining its proper relation between chambers 26 and 27.

The absolute pressure value of the fluid flowing into the sensing device will hereinafter be referred to as $P_1$, even though such value normally changes or varies from time to time. It will be understood that when the fluid has an absolute pressure value of $P_1$ in the chamber 26, the pressure of the fluid in chamber 27 has a lower absolute pressure value $P_2$ due to the drop in pressure through the orifice $A_1$, so that the force exerted on the piston 25 is equal to the cross-sectional area of the piston multiplied by $(P_1-P_2)$ where $(P_1-P_2)$ is the net pressure on the piston.

With critical flow being maintained through the orifice $A_2$, the following is true:

$$P_2 \propto P_1$$

(or)

$$P_2 = KP_1 \text{ (where } K = \text{a constant)}$$

(changing signs)

$$-P_2 = -KP_1$$

Adding $P_1$ to opposite sides of the above equation, the following is attained.

$$P_1 - P_2 = P_1(1-K)$$

(or)

$$P_1 - P_2 = K_2 P_1$$

(where $K_2$ is a second constant equal to $1-K$)

Since $(P_1-P_2)$ multiplied by the cross-sectional area of the piston equals the force exerted on the piston, it will now be seen that the force on the piston is also equal to $K_2P_1$ times the area of the piston. Hence, the force exerted on the piston is directly proportional to $P_1$. The above is true, regardless of the position of the piston in the bore, provided that the bore is of uniform cross-section throughout.

With the above arrangement, considerable power is available at the lower end of the shaft 28 to actuate externally located valves, relays or the like with a high degree of accuracy.

However, should it be desired to utilize the sensing device 20 as a position indicator in which the axial movement of the shaft 28 is directly proportional to the pressure $P_1$, the shaft 28 may be biased in a direction to oppose the pressure $P_1$ of the fluid by means of a helical spring 32 or the like. For illustration purposes, the spring 32 has been shown as confined between a collar 33 attached to the shaft 28 and the lower face of the end wall 23 of the housing. With this arrangement, the piston attains a predetermined position of rest when $P_1$ equals zero and moves upwardly against the bias of the spring 32 upon increase in value of $P_1$. By proper selection of the spring, a range of movement of the piston 25 in upward direction may be attained to accommodate any range of values of $P_1$ for which the device may be designed.

It will now be seen that the invention provides an extremely simple and foolproof absolute pressure sensing device which is inherently rugged and durable and which may be expected to have a long, useful and trouble-free life.

When the spring 32 is omitted the device must be positioned with the axis of the shaft 28 inclined upwardly and the opening 30 lowermost, so that the piston 25 is biased by gravity toward the opening 30. However, the device may be positioned in any desirable manner when the spring 32 is utilized in conjunction therewith.

By properly fitting the shaft 28 and the housing 21 so that a smooth sliding fit is attained between the upper end of the shaft and the bore $29a$, and the lower portion of the shaft and the opening $23a$, friction therebetween may be reduced to a minimum, further enhancing the accuracy of the device. A small amount of leakage between the shaft 28 and the opening $23a$ is not detrimental to operation of the device.

It must further be pointed out that the device is not limited to apparatus where the pressure of the fluid is of a low order but may be utilized in installations having relatively large fluid pressure values.

While the invention has been shown in but one form, it will be obvious to those skilled in the art that it is not so limited, but is susceptible of various changes and modifications without departing from the spirit thereof.

What is claimed is:

An absolute gas pressure sensing device comprising a housing having an inner peripheral wall and a pair of end walls connected to the opposite ends of said peripheral wall to provide a closed compartment, a piston disposed in said compartment and dividing the same into first and second chambers, a shaft extending into said compartment through said end walls and in slidable relation therewith, said piston being rigidly attached to said shaft and jointly movable therewith, said piston having a smaller cross-sectional area than the area encompassed by said inner wall and together therewith providing a first restricted orifice of annular shape in communication with said first and second chambers, means including an unrestricted inlet providing a continuously open and unrestricted communication between said first chamber and a source of fluid under pressure, means providing a second restricted orifice in communication with said second chamber and the ambient and formed in a manner to maintain continuous critical flow conditions during operation; whereby, when said critical flow conditions prevail in said second restricted orifice, said piston is subjected to a force which varies directly as the absolute pressure of said gas and transmits said force externally of said housing through said shaft, and further including a spring for biasing said piston and said shaft against the force exerted by said gas, whereby the length of axial travel of said shaft varies directly as the absolute pressure of said gas.

References Cited in the file of this patent

UNITED STATES PATENTS

| | | |
|---|---|---|
| 1,697,344 | Campbell | Jan. 1, 1929 |
| 2,244,007 | Harrington et al. | June 3, 1941 |
| 2,298,150 | Newton | Oct. 6, 1942 |
| 2,468,768 | Malick | May 3, 1949 |
| 2,593,339 | Ostermann et al. | Apr. 15, 1952 |
| 2,641,130 | Grisdale | June 9, 1953 |

FOREIGN PATENTS

| | | |
|---|---|---|
| 581,478 | France | Sept. 29, 1924 |
| 706,526 | France | Mar. 30, 1931 |
| 154,667 | Australia | Jan. 6, 1954 |